United States Patent Office 3,420,540
Patented Jan. 7, 1969

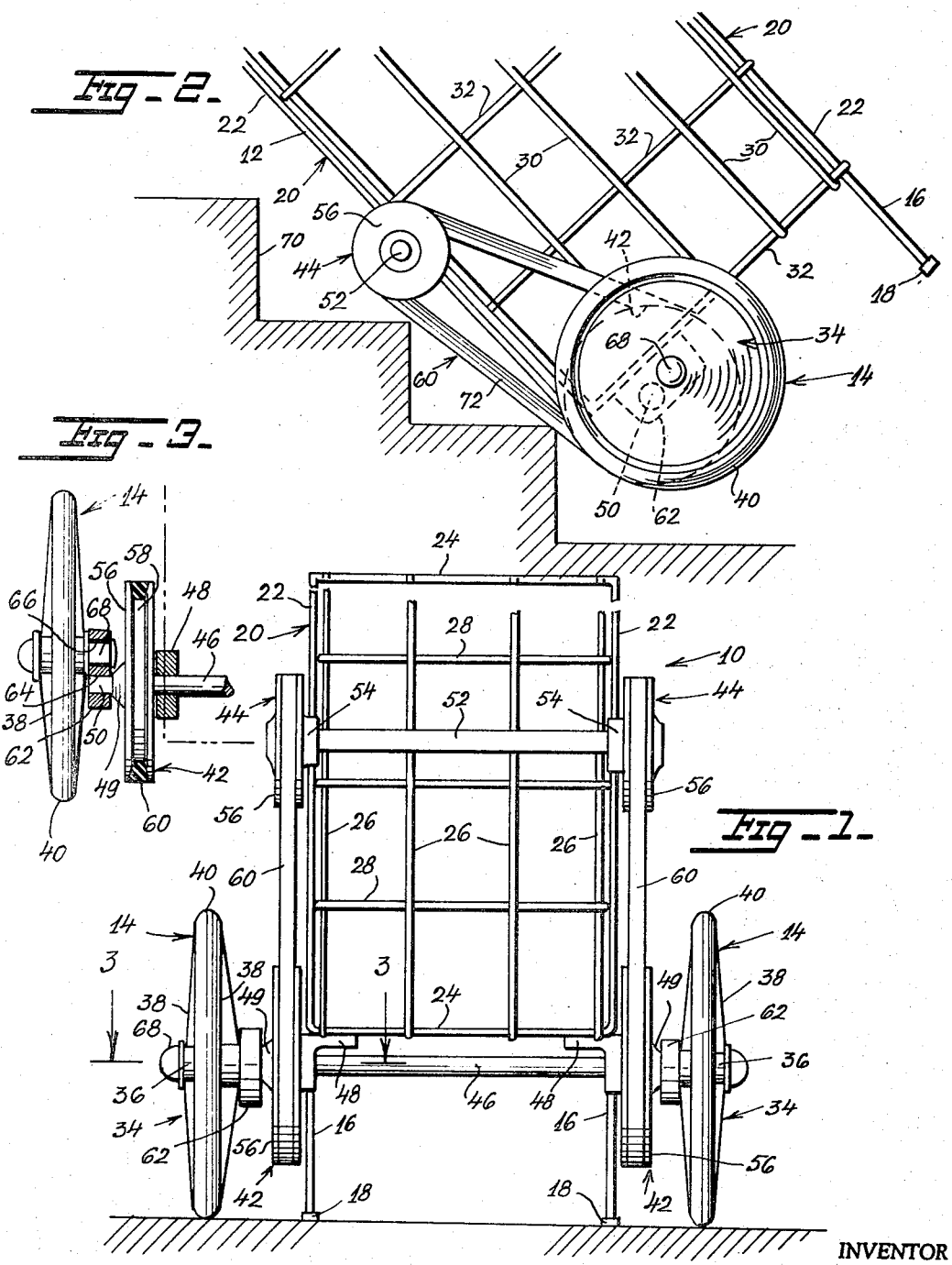

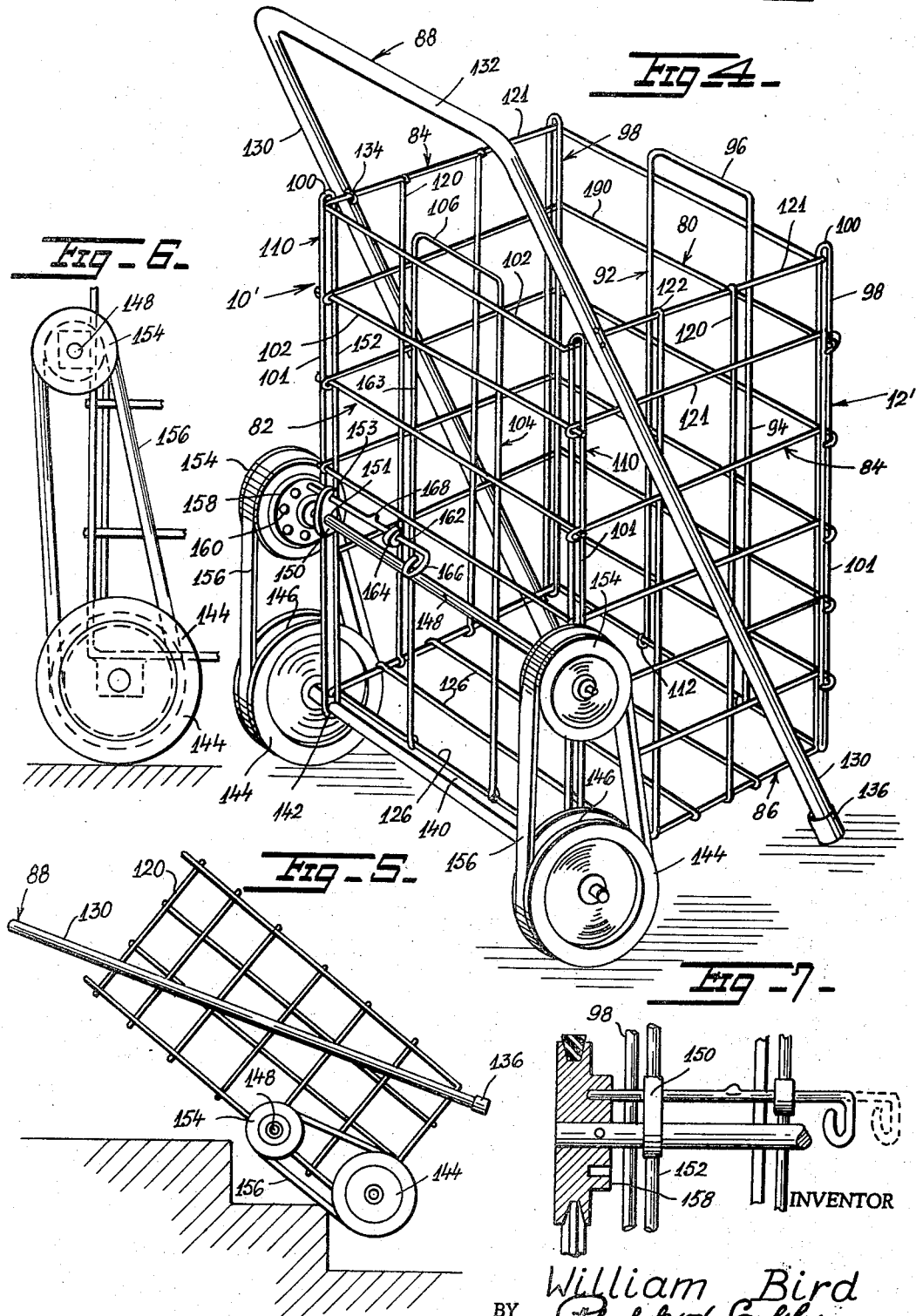

3,420,540
SHOPPING CART WITH ENDLESS BELT STAIR CLIMBING MEANS
William Bird, 19 Cummings St., New York, N.Y. 10034
Filed Oct. 6, 1966, Ser. No. 584,741
U.S. Cl. 280—5.22
Int. Cl. B62b *5/00;* B62b *1/00*
8 Claims

ABSTRACT OF THE DISCLOSURE

A shopping cart having track type treads to facilitate use of the cart on stairways and the like. The treads allow for free movement of the cart body with respect to stair treads and cooperate with cart wheels to enable the user to easily and expeditiously handle a loaded cart in ascending and descending the stairs. The cart is provided with a pair of traction wheels at the bottom thereof for movement along a horizontal supporting surface and with track type treads for movement at an angle to the horizontal, such as movement up and down stairs.

---

This invention relates generally to new and useful improvements and structural refinements in shopping carts, and more particularly to a shopping cart provided with track type treads.

With the advent of supermarkets, it is quite general for housewives and others to transport groceries or other articles of shopping in wheeled carriers or baskets, from the store to the home. Such shopping carts or baskets, however, are usually of a two-wheel type. Consequently, it is very tiring for a housewife or other shopper to manage such carts, particularly if they are well loaded, where it is necessary for the user to climb stairs thus involving the necessity of getting the cart up and down stairs.

While applicant is aware that carts of this nature have been previously manufactured, such carts have been found to be wanting because of their complexity of structure which makes manufacture expensive or because their working parts get out of order easily or for lack of maneuverability.

It is therefore a primary object of the present invention to provide a shopping cart that includes tread devices that materially facilitate the use of the cart on stairways and the like, in that said devices act to allow for free movement of the cart body with respect to stair treads and cooperate with the cart wheels to enable the user to easily and expeditiously handle a loaded cart in ascending and descending the stairs.

Still another object of the invention is to provide a shopping cart with a pair of traction wheels at the bottom end thereof for movement along a horizontal supporting surface and with track type treads for movement at an angle to the horizontal, such as movement up and down stairs.

Yet another object of the invention is to provide a shopping cart of simple and practical construction, which is strong and durable, relatively inexpensive to manufacture and otherwise well adapted for the purpose for which the same is intended.

Broadly, the invention comprises a shopping cart having a pair of traction wheels at one end thereof mounted on separate axles, and spaced pairs of rotatable discs, the pairs of discs having separate axles, the axles of the traction wheels being slightly offset from the axle of one of said pairs of discs whereby the track type treads are adapted to engage the treads of the stairs for movement of the cart on said treads along the stairway.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a rear elevational view of a shopping cart embodying one form of the invention, parts being shown broken away.

FIG. 2 is a fragmentary side elevational view thereof showing the cart negotiating a flight of stairs.

FIG. 3 is a sectional view taken on the plane of the line 3—3 of FIG. 1.

FIG. 4 is a rear perspective view of a shopping cart embodying a modified form of the invention.

FIG. 5 is a reduced side elevational view thereof showing the cart negotiating a flight of stairs.

FIG. 6 is a side elevational view of a track type tread assembly.

FIG. 7 is a part sectional and part elevational view of the wheel locking mechanism.

Referring now in detail to the various views of the drawings, in FIG. 1 for the purpose of illustration I have disclosed an embodiment of my invention in the form of a shopping cart 10. The cart 10 includes a body which is generally designated at 12 and which may be more specifically defined as a basket, a pair of rear supporting or traction wheels 14 and a pair of front or forward supporting legs 16 with rubber caps 18. The body is preferably formed of tubular metal such as chromed steel or aluminum.

The body or basket 12 is composed of metal lattice work at the front, back and sides and on the bottom, the top being open. The lattice work at the rear and front is similar and as seen in FIG. 1, each consists of a rectangular shaped closed frame 20, with vertical side frame members 22 and cross end frame member 24 at the top and bottom end thereof. Vertical bars 26 are secured at their top and bottom ends to the cross end frame members 24 of the frame. Spaced horizontally disposed cross bars 28 across the vertical bars 26 at spaced intervals therealong and are secured at their ends to the sidemost vertical bars 26. The bottom of the frame is formed with criss-cross horizontal bars. The side frame members 22 of the frame at the front are extended below the bottom end frame 24 forming the supporting legs 16.

The lattice work at the sides of the basket body is similar to the front and rear and consists of vertical metal bars 30 and cross bars 32.

The supporting or traction wheels 14 are mounted at the rear of the basket body at the bottom thereof. Each wheel 14 has a disc-shaped body 34 with perforated hub portion 36 and ribs 38 radiating outwardly from the hub portion. A rubber tire 40 is mounted on the periphery of the body.

In accordance with the present invention, a pair of metal discs or wheels 42 is mounted closely spaced inwardly of the outer traction wheels 14, and another pair of discs or wheels 44 is mounted on the basket body spaced longitudinally of the discs 42 and in alignment therewith. The discs 42 are rotatably mounted on the ends of a shaft or axle 64 journalled in L-shaped hanger bearings or brackets 48 fixed to the ends of the bottom end frame member 24 of the rear frame 20. The discs 42 are normally positioned above the horizontal plane of the traction wheels 14 as seen in FIG. 1. The ends of the shaft or axle 46 of the discs 42 extend outwardly beyond the hub portions 49 of the discs 42 thereby forming stub shafts 50. The discs 44 are rotatably mounted on the ends of a shaft or axle 52 supported in L-shaped bearings or brackets 54 secured to the side frame members 22 of the frame 20 at the rear of the basket body. The diameters of the end discs 42 are approximately twice the diameters of the discs 44. Each of the discs 42 and 44 is similarly constructed having a disc-shaped solid body 56 with a peripheral groove 58 formed therein. A rubber endless tread or belt 60 is looped around the discs 42 and 44 and fitted in grooves 58, at each side of the basket body. A bearing member in the shape of a rectangular shaped metal plate 62 is interposed between each traction wheel 14 and its adjacent disc 42. The bearing plates are formed with transverse holes 64 and 66 at the ends thereof spaced in alignment with each other. The stub shafts 50 on the adjacent ends of axle 46 are journalled in holes 64 and stub shafts 68 supported in the perforated hub portions 36 of the traction wheels 14 are journalled in the other holes 66 as best seen in FIG. 3. The axes of the stub shafts 50 and 68 are thus offset from each other whereby the traction wheel 14 is adapted to swing bodily around the stub shaft 50 of the disc 42.

In use, when the cart is being operated on plane horizontal supporting surfaces, the cart will travel on the traction wheels 14, 14. However, when it is desired to move the cart up or down a flight of steps 70 of a stairway as shown in FIG. 2, the traction wheels 14, 14 are manually swung upwardly on stub shafts 50 in order to position the bottom runs 72 of the belts 60 tangentially of the peripheries of the wheels as shown in FIG. 2 whereby the lower runs of the belts will engage the outer edges of the treads of the steps of the stairway to effect a relatively smooth passage of the cart and absorb the bumps and shocks imparted thereto by the edges of the treads of the steps.

In FIGS. 4 to 7, inclusive, a cart 10' embodying a modified form of the invention is illustrated. The cart 10' includes a body which is generally designed at 12' and which may be more specifically defined as a basket. The body of the basket includes a front section 80, a rear section 82, two side sections 84, 84, a bottom section 86 and a U-shaped handle 88.

Front section 80 includes a plurality of horizontal rigid bars 90. A U-shaped rigid bar 92 has each of its vertical legs 94 secured to each of the horizontal bars 90. The bight portion 96 of the U-shaped bar 92 projects above the uppermost horizontal bar 90 thereby providing a handle. An endless rigid bar 98 is welded to each of the outer ends of horizontal bars 90. Again the bight portions 100 are uppermost and project over the top of uppermost horizontal bar 90. The legs 101 of endless bars 98 are spaced a distance which is slightly greater than the diameters of the bars comprising side sections 84.

Back section 82 is similar to the front section 80 and includes a plurality of horizontal rigid bars 102. Central U-shaped rigid bar 104 is welded to each of the bars 102 and has the bight portion 106 uppermost. Again, the bight portion 106 projects above uppermost bar 102. A pair of rigid endless bars 110 are welded to the outer ends of each of the horizontal bars 102.

Side sections 84 each comprises a plurality of vertical rigid bars 120 and horizontal bars 121 welded to the vertical bars 120. The ends of the vertical bars are looped around the horizontal bars 121 as indicated at 122. The legs of the endless bars 98 and 110 are spaced apart a distance which is slightly greater than the diameter of bars 121.

Bottom section 86 comprises a plurality of transversely extending rigid bars 126. The ends of bars 126 are looped over lowermost horizontal bars 121.

Handle 88 is basically U-shaped and includes legs 130 with bight portion 132 uppermost. The legs 130 are pivotally secured to the sides 84 of the cart. In the embodiment shown, the securement is obtained by metal loops 134 secured to the legs 130. The legs project downwardly going from the rear to the front of the cart. The bottom of the legs are positioned below the bottom section 86 of the cart. The ends of the legs are closed by frictional caps 136 which may be made of rubber.

In accordance with this form of the invention, an axle or shaft 140 is journalled in the bottom bight portions 142 of the endless rods 110 at the rear of the body of the basket. The axle extends laterally of the body of the basket and supports at its ends a pair of discs 144 formed with V-shaped grooves 146 along the peripheries thereof.

Another shaft or axle 148 is spaced longitudinally of the body of the basket in alinement with the axle or shaft 140. The shaft or axle 148 is supported by and extends through oval-shaped brackets or bearings 150 secured along the edge thereof to one leg 152 of each adjacent endless bar 110. The brackets are formed with spaced holes 151 and 153 at the ends thereof. Axle or shaft 148 extends through the holes 151 in brackets 150. Discs 154 are mounted on the ends of axle or shaft 148 in alinement with the discs 144, the discs 154 being formed with grooves similar to the grooves of discs 144. The diameters of the discs 144 are about twice that of the discs 154. Endless treads or belts 156 of rubber are trained around the discs and are fitted in the grooves thereof.

One of the discs 154, the left hand disc as seen in FIG. 4, is formed with a hub portion or enlargement 158 on its inner face. The enlargement is formed with a series of annular holes 160. A rod 162 is horizontally slidable on the rear section 82 of the basket. The rod 162 slides through a bracket 164 fixed on one leg 163 of the U-shaped bar 104 adjacent the left hand disc 154, and through hole 153 in bracket 150. One end of the rod is looped as indicated at 166 forming a handle for manipulating the rod. The other end of the rod is adapted to be inserted into one of the holes 160 of enlargement 158 in order to interlock the disc 154 to the basket thereby preventing turning of said disc 154 and thus prevent turning of the other discs so that the cart is protected against accidental movement. The rod is formed with a lug 168 intermediate its ends serving as a stop to limit endwise movement of the rod.

The shopping cart 10' is used for transporting packages in the position shown in FIG. 4. Thus after packages have been placed in the cart, the handle 88 is tilted backwardly and the user can then pull the cart on the discs or wheels 144.

When the cart is being operated up or down a flight of stairs as seen in FIG. 5, the lower runs of the belts or treads 156 will engage the outer edges of the treads of the steps to effect a relatively smooth passage of the cart and absorb the bumps and shock imparted thereto by the edges of the treads of the stairs.

What is claimed is:

1. A shopping cart of the kind described comprising a latticed body equipped with a rotatably mounted transversely extending first shaft on the rear side at the bottom end thereof, discs mounted at the ends of said shaft, a second rotatably mounted transverse shaft upwardly of the first shaft and parallel therewith, discs on the ends of said second shaft aligned with the discs on the first shaft, endless belts trained around said discs, and traction wheels eccentrically mounted on said first shaft for swinging movement around the end discs to a position above and below the lower run of said belt.

2. A shopping cart of the kind described as defined in claim 1 wherein the eccentric connections between the end discs and wheels include a plate-like bearing with holes across the ends thereof, extensions on the shaft mounting the end discs, said extensions journalled in one of the holes in said bearings, stub shafts mounting said traction wheels, said stub shafts having one end journalled in the other hole of the bearings so that said traction wheels may be manually rotated relative to said discs whereby the belts are disposed tangentially relative to the peripheries of the traction wheels for movement up and down steps of a stairway.

3. A shopping cart of the kind described in claim 1, wherein the latticed body includes vertical bars and horizontal bars crossing said vertical bars, and wherein the mounting for the first shaft includes L-shaped bearing members fixed to the bottommost cross bar for supporting ends of the first named shaft and L-shaped bearings fixed to the outermost vertical bars for supporting the second transverse shaft.

4. A shopping cart of the kind described in claim 1, wherein the latticed body includes elongated endless bars at the corners thereof, and wherein the first-named transverse shaft is journalled in one end of the endless bars at the rear bottom end of the body, and wherein the discs on said first-named transverse shaft protrudes beyond said bottom end of the body.

5. A shopping cart of the kind described as defined in claim 4 characterized by an inverted U-shaped handle pivotally supported on the body and projecting above the top of the body.

6. A shopping cart of the kind described as defined in claim 4 characterized by means for preventing accidental rotation of the discs.

7. A shopping cart of the kind described as defined in claim 8 wherein the means for preventing accidental rotation of the discs includes an enlargement on the inner face of one of the discs on the second shaft, said enlargement having a series of annular holes and a sliding bar slidably mounted in stationary parts of the body, one end of said bar adapted to be inserted into one of the holes in the enlargement whereby the discs are prevented from turning.

8. A shopping cart of the kind described as defined in claim 7 wherein the stationary parts of the body are constituted by perforated brackets on the body through which the rod slides, and a lug on the rod for limiting sliding movement thereof.

References Cited
UNITED STATES PATENTS

| | | | |
|---|---|---|---|
| 1,554,034 | 9/1925 | Richie. | |
| 2,132,069 | 10/1938 | Hall | 280—5.22 |
| 2,214,311 | 9/1940 | Stevens | 280—5.22 |
| 2,468,604 | 4/1949 | Salat | 280—36 |
| 2,920,900 | 1/1960 | Best | 280—36 |
| 3,092,200 | 6/1963 | Chambers | 280—5.22 X |
| 3,104,113 | 9/1963 | Montz | 280—5.22 |
| 3,370,664 | 2/1968 | Caplan | 180—9.22 |

RICHARD J. JOHNSON, *Primary Examiner.*

U.S. Cl. X.R.

280—47.26